Jan. 2, 1940.         A. D. HILL, JR         2,185,666
                         FISHING GEAR
                      Filed Jan. 25, 1938
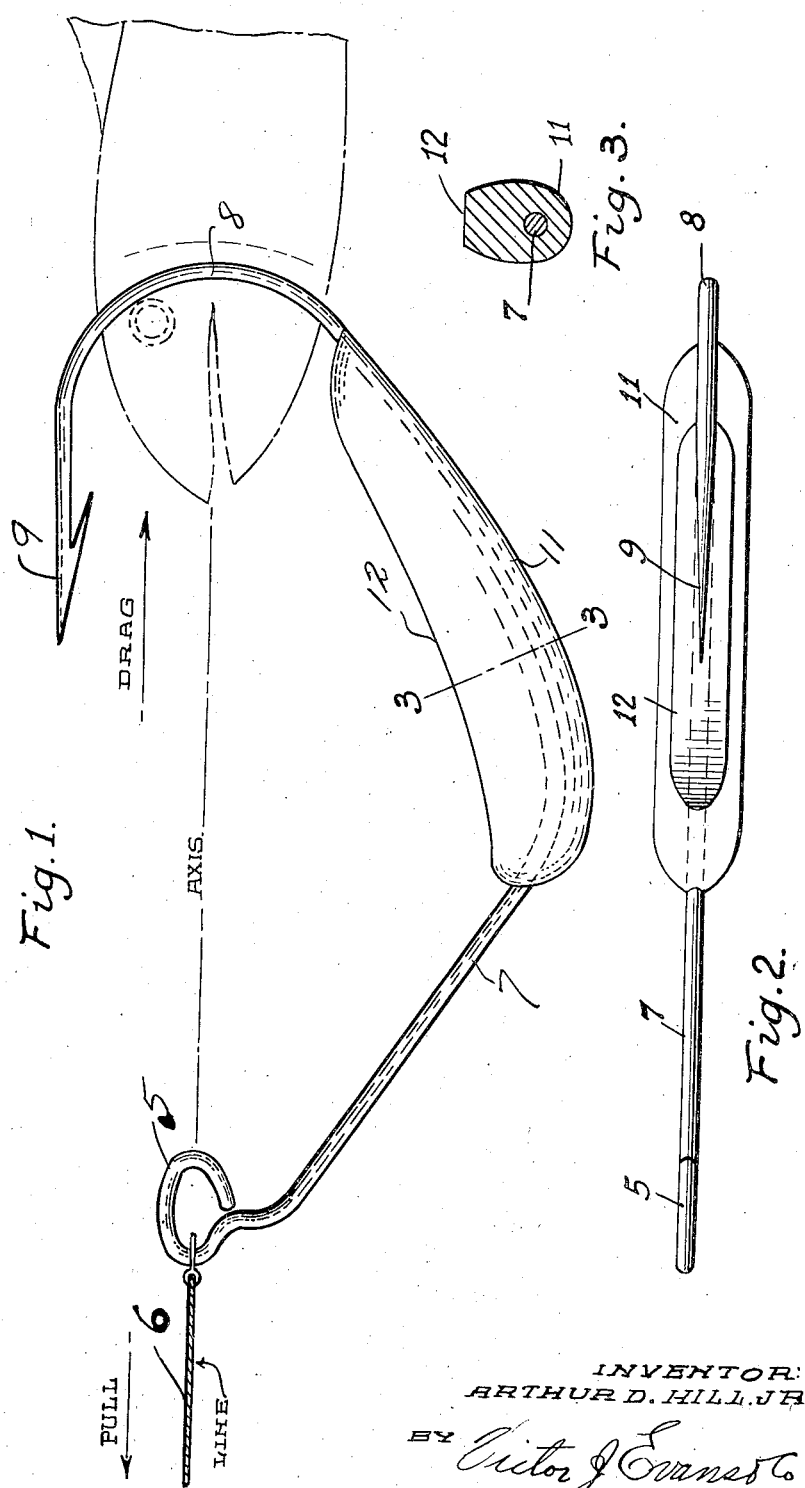
INVENTOR:
ARTHUR D. HILL, JR.
ATTORNEYS Patented Jan. 2, 1940

2,185,666

UNITED STATES PATENT OFFICE 2,185,666

FISHING GEAR

Arthur D. Hill, Jr., Los Angeles, Calif.

Application January 25, 1938, Serial No. 186,869

2 Claims. (Cl. 43—54)

This invention relates to improvements in fishing gear and has particular reference to a trolling hook.

The principal object of this invention is to provide a trolling hook upon which bait may be placed, such as a small fish, and when the same is drawn through the water, the bait fish will have the appearance of swimming, so that it acts as a lure in catching larger fish.

A further object is to provide means whereby the drawing of the line through the water will maintain the fish in an upright position and upon a substantially even keel.

A still further object is to provide means to prevent the bait fish from spinning about the axis of the drawing line.

A further object is to produce a device of this character which is economical to manufacture, and simple to employ.

Other objects and advantages will be apparent during the course of the following description.

In the accompanying drawing forming a part of this specification and in which like numerals are employed to designate like parts throughout the same, Figure 1 is a side elevation of my device, as the same would appear in use.

Figure 2 is a top plan view thereof, and Figure 3 is a vertical sectional view taken on the line 3—3 of Figure 1.

In fishing, particularly in trolling, it is the object of the fisherman to employ a lure which will simulate the movement of a fish in a lifelike manner. As the trolling is often done from a boat which moves at a relatively rapid rate of speed, the bait fish being drawn behind the boat has a tendency to spin, which quickly ruins a line and also thwarts the purpose of the lure, namely, naturalness.

I have, therefore, devised a trolling hook which consists of an eye 5, to which the line 6 is attached. This eye 5 is bent to form a downwardly extending shank 7 which is curved as at 8 and terminates in a barb 9. The bait fish, shown in broken lines, is secured upon the curved portion 8, and between this curved portion and the shank 7 I place a weight 11, having a relatively flat surface 12, which surface is inclined downwardly from the curved end toward the shank.

The result of this construction is that when the line 6 is moved through the water, the shape of the bait fish and the pull of the line on the water tends to lift the hook and bait out of the water. However, the downwardly extending surface 12, which is contacted by the water passing thereover, tends to counteract this upward pull just described and maintains the hook and bait below the surface and in the proper position, so that the bait fish appears to be moving through the water in a normal manner and is, therefore, an attractive lure to a larger fish.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A trolling hook of the class described embodying a shank having an eye formed at one end thereof, said shank extending downwardly and angularly from said eye and thence curved upwardly and inwardly toward the eye and terminating in a barb, and a flattened weight positioned upon said curved section of the shank and inclined downwardly toward the angularly disposed section of said shank.

2. A trolling hook of the class described embodying a shank having an eye formed at one end thereof, said shank extending downwardly and angularly from said eye and thence curved upwardly and inwardly toward the eye and terminating in a barb, and a weight positioned upon said curved section of the shank and inclined downwardly toward and terminating at the juncture of the angularly disposed and curved sections of the shank, said weight having a flat upper surface, whereby when the hook is drawn through the water it will be held below the surface and be prevented from spinning.

ARTHUR D. HILL, JR.